United States Patent
Kalantri

(10) Patent No.: US 9,619,332 B2
(45) Date of Patent: Apr. 11, 2017

(54) METHOD AND SYSTEM FOR EFFICIENTLY MANAGING CONTENT ON AN INFORMATION HANDLING DEVICE

(75) Inventor: Atul Laxmikant Kalantri, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 1313 days.

(21) Appl. No.: 11/865,274

(22) Filed: Oct. 1, 2007

(65) Prior Publication Data

US 2009/0089301 A1 Apr. 2, 2009

(51) Int. Cl.
*G06F 17/30* (2006.01)
*G06F 11/14* (2006.01)

(52) U.S. Cl.
CPC ...... *G06F 11/1451* (2013.01); *G06F 11/1469* (2013.01)

(58) Field of Classification Search
USPC .................................. 707/654, 640
See application file for complete search history.

(56) References Cited

U.S. PATENT DOCUMENTS

| | | | |
|---|---|---|---|
| 5,710,922 A * | 1/1998 | Alley et al. ................ | 707/201 |
| 5,742,807 A * | 4/1998 | Masinter .................... | 707/610 |
| 5,765,173 A | 6/1998 | Cane et al. | |
| 5,813,009 A * | 9/1998 | Johnson et al. ............. | 707/100 |
| 5,924,102 A | 7/1999 | Perks | |
| 2003/0037097 A1* | 2/2003 | Meyer et al. ................ | 709/202 |
| 2005/0198565 A1* | 9/2005 | McChrystal .................. | 715/511 |
| 2006/0004814 A1* | 1/2006 | Lawrence et al. .......... | 707/101 |
| 2006/0106885 A1* | 5/2006 | Blumenau et al. .......... | 707/200 |
| 2006/0136903 A1 | 6/2006 | Childress et al. | |
| 2006/0206541 A1* | 9/2006 | Shimogori et al. ......... | 707/203 |

OTHER PUBLICATIONS

WhatIs.com, "What is Hashing?" WhatIs.com, Sep. 2005, # of pp. 2; http://searchsqlserver.techtarget.com/definition/hashing.*

* cited by examiner

*Primary Examiner* — Boris Gorney
*Assistant Examiner* — Amanda Willis
(74) *Attorney, Agent, or Firm* — Brian J. Colandreo, Esq.; Jeffrey T. Placker, Esq.; Holland & Knight LLP

(57) ABSTRACT

Disclosed is a method for managing content on an information handling device, involving identifying creation of new content on the information handling device; tagging the content created on the information handling device with a unique identifier; and storing the unique identifier in a registry. When a risk to the information handling device is perceived, a plug-in on the device efficiently manages the content on the device.

17 Claims, 3 Drawing Sheets

METHOD AND SYSTEM FOR EFFICIENTLY MANAGING CONTENT ON AN INFORMATION HANDLING DEVICE

FIELD OF THE INVENTION

This invention relates to a system and method for an identifying critical content and managing the critical content on individual user device, preferably an information handling device.

BACKGROUND OF THE INVENTION

Conventionally, a relatively large amount of critical and important content such as data etc., in business entities, for example in a corporate, resides on individual user machines, such as the personal computer, laptop computer etc. While backup of server machines is a routine activity that most business entities perform regularly, in the absence of an effective and practical backup mechanism on individual user machines, the critical content stored on the individual machines is vulnerable to loss of data in the event of a hard disk drive (HDD) crash. The onus of backing up data on the individual machine lies with individual user, as content typically needs to be selectively backed up. Though there may be several methods and tools available to configure automated backup of specific content on the machine, once configured only content that has been configured to be backed up will be backed up leaving the rest of the content vulnerable to loss by a HDD crash or a virus attack. A further disadvantage being the reliability of the HDD, wherein content that has not been backed up has a risk of losing critical and important content stored on the individual users machine.

Further, as described previously since the onus of backing up content on the individual machine lies with individual users, for business entities, this could mean enforcing all users in the business entity to periodically back-up contents stored on individual machines. A disadvantage with this being a waste of time and effort of the user in performing the task. A further disadvantage being the unnecessary use of resources being used as large amounts of content is duplicated.

Also, in cases when a user decides to backup his machine, the current backup solutions may not provide any suitable mechanism for easy identification of vulnerable and/or unique content on the users machine that should be necessarily backed up, where vulnerable and/or unique content is recognized to be exclusively on the users machine and a copy of that content is not stored or available any place else. A disadvantage in such a scenario being that the backup process is manually performed and time consuming adding to the disincentive that a user will not perform the task of backing up data periodically.

There is therefore a need for an efficient solution for identifying and backing, up critical content that is available on individual user machines, thereby avoiding any loss of content. Without a way to provide a method and system for efficiently identifying content and backing up that content the promise of this technology may never be fully achieved.

SUMMARY OF THE INVENTION

Accordingly, the present invention provides a system and method for efficiently identifying relevant content on an individual's machine and creating a suitable backup of the identified content. The method for managing content on an information handling device consists of identifying creation of new content on the information handling device, where the new content is either created on the information handling device or is downloaded from another device or location which has a identifier such as a IP address etc. the content is then tagged on the information handling device with a unique identifier; and the unique identifier is stored in a registry. The registry is backed-up in a central repository. The method also consists of providing a visual indicator to the user to differentiate between content created on the information handling device and content fetched for a different location or device, wherein the visual indicator is a coloring scheme.

In a further embodiment, the method consists of retrieving the tagged content when restoring the information handling device using the registry; and storing the retrieved content in the same format as present before the restore was performed. Other embodiments are also disclosed. An advantage with the present method being the ability to differentiate original content and downloaded content that helps in assessing the content that is at risk and taking preventing measures against such risks. A further advantage being the ability to automatically retrieve the tagged content, while re-storing a information handling device, by using the backed up registry file and then storing the retrieved data in the same manner that it was stored earlier on the file system, thus helping to restore the file system to the same state, which the user is used to finding the content.

DETAILED DESCRIPTION

Figure 1:
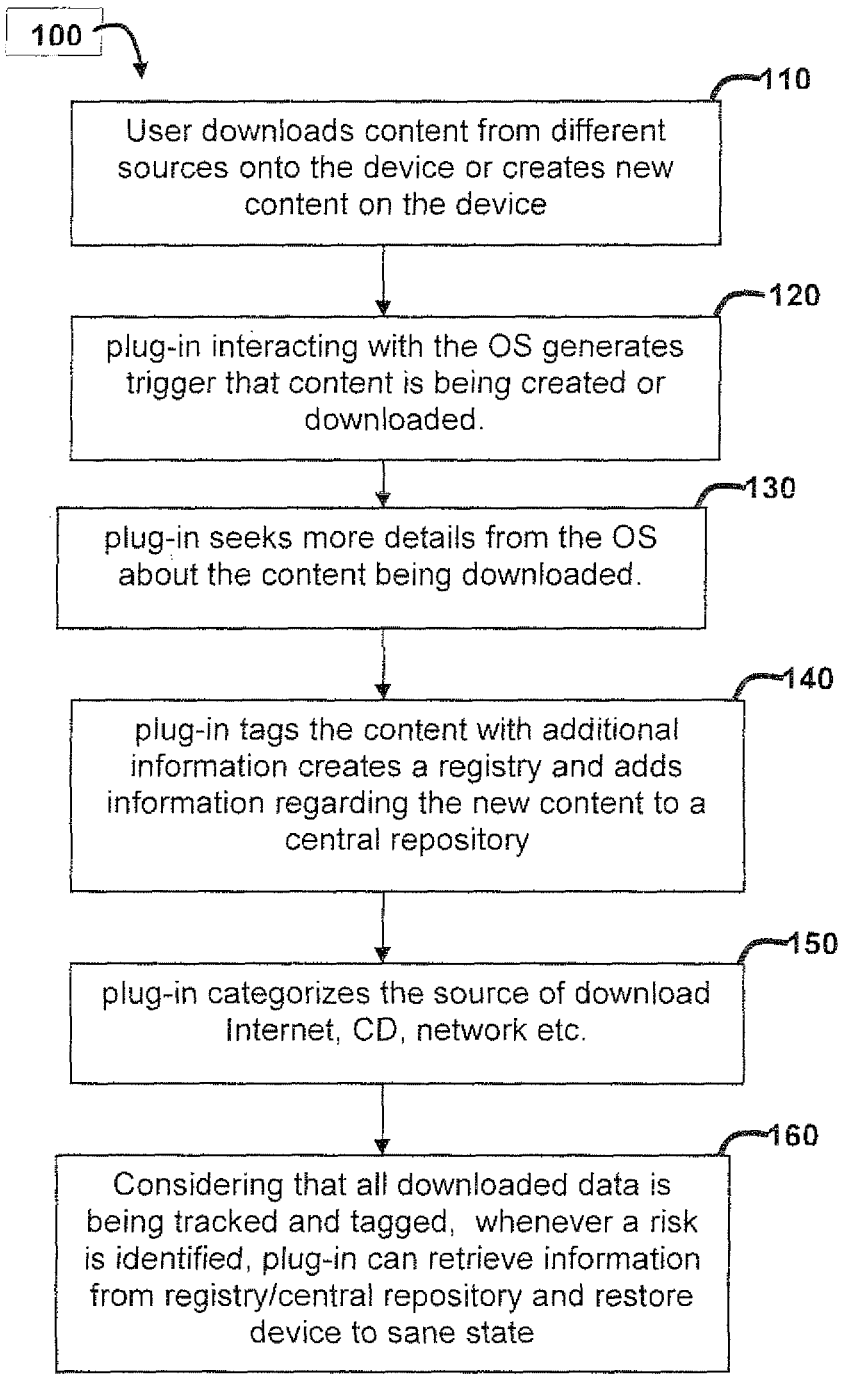
FIG. 1 illustrates an exemplary embodiment of a method for managing content on an information handling device.

Where reference is made in any one or more of the accompanying drawings to steps and/or features, which have the same reference numerals, those steps and/or features have for the purposes of this description the same function (s) or operation(s), unless the contrary intention appears. The terms "software", "code", "program", "computer program", "set of instructions" or "instruction" are used synonymously. The term "content", "data", "instructions" etc are used synonymously. The term "information handling device" refers to devices that comprise at least a processor and a memory and are capable of processing information such as personal computer, laptop computers, personal digital assistants, mobile phones etc. the words "plug-in" and "agent" are synonymously used.

Typically, a user using an information handling device either creates content on the device or downloads content from different sources, for example the sources can include the Internet, company intranet, e-mail servers, another device etc. Content referred to in this invention include all types of information including software program codes, web pages, images, document files, presentations, text data, audio data, video data and so on. When such content is being created or downloaded, the Operating system residing on the device is provided with an agent, which is configured to detect that content is either being created or downloaded on the device. Typically, this can be done by the plug-in, which may be either in the form of software or hardware residing as an active agent on the information handling device, and directly interacting with the operating system.

The plug-in is configured for issuing or generating a trigger mechanism on the information handling device to identify that new content is being created on and/or downloaded onto the information handling device. The plug-in which is an active agent can be configured to typically seek more details from the operating system as to the content being created or downloaded onto the device, and store all such details into a tag and associate the tag and the unique identifier with the content on the information handling device.

The plug-in is configured to generate a unique identifier for all new content that is being created on or downloaded onto the device by interacting with the operating system. Once a unique identifier has been created, the plug-in is configured to store the unique identifier in a registry associated with the operating system of the device and also back-up the registry into a central repository. An advantage of this being that the data need not be backed-up as long as the registry is backed-up especially when content is downloaded from the Internet and in case the content that was downloaded onto the device was at risk such as being deleted, the agent can fetch the details from the central repository and download the data to the same locations as was in the disk prior to the deletion. For example in one embodiment, the plug-in can be configured to categorize the content and the media while associating the unique identifier and periodically update the registry. Based on the information stored in the registry, the plug-in can be configured to ping the other device, such as a server and/or a locations like an internet site and check if the content is available or any risk is posed to the content at the other device and/or location. If such a risk posed to the content is determined and/or the content is unavailable at the site, the plug-in can suitably intimate the user of the device to create a back-up of such content. In one embodiment, the plug-in can automatically create the back-up of such content, update the registry and intimate the user of the device.

FIG. 1 illustrates an exemplary embodiment of a method 100 for efficiently identifying relevant content on an individual's machine and creating a suitable backup of the identified content when a risk has been detected. Here relevant content refers to either new content being created on the information handling device or available content being downloaded onto the device as new content from another device and/or a location. The method begins at step 110 when new content is being created on the system and/or content available at another device, such as a intranet server etc., or another location such as a internet site, is being downloaded onto the device. Typically the content sources can therefore include anything from the Internet, Intranet, service provider, servers etc from where the content may be downloaded onto the device. The form of the content can be anything ranging from text files, documents, database queries, images, audio data, video data, audio-video data, software programs containing code, binary files and so on. It should be apparent to a person skilled in the art that this invention is not limited to the form and types of content described above and includes within its scope all other forms information of content available in the art.

In step 120 the operating system of the device is associated with the plug-in, where the plug-in is in the form of a software or hardware agent embedded on the device and works in conjunction with the operating system. The agent is active on the device and on determining either that new content is being created or downloaded onto to the device, the plug-in (hereinafter also referred to as the agent) generates a trigger to indicate that new content is being created or downloaded (hereinafter referred to as new content). In step 130, the agent is configured to seek more details from the operating system about the content being downloaded. This is not a mandatory step and may be skipped in some cases as decided by the agent.

In step 140, the agent is configured to associate a unique identifier and stores the unique identifier with other relevant details of the new content in a registry. If in step 130, additional information has been requested by the agent, then the agent associates the unique identifier and the relevant details along with the requested additional information and stores the information in the registry. In a further embodiment, to avoid malice related with risk of loosing content and the information stored in the registry, the agent is configured to store the information available in the registry into a central repository. In one embodiment, the agent may detect the risk posed by the content, and if the risk detected by the agent is termed beyond a threshold value, the agent may be configured to download the content and store the content at a relevant location on the central repository and create a suitable link to the information (such as a tag) stored in the registry and the central repository linking the stored content with the tag.

In step 150 which is an optional step, the agent is configured to categorize the source of download as say Internet, CD, Intranet etc. an advantage of this being that for sources including the physical media like CDs that cannot be automatically checked, the user can be notified that the content needs to be stored safely and a relevant back-up on a central repository may be created. In step 160, when all content has been downloaded and the registry maintained, the agent tracks all content that has been tagged, and whenever a risk is identified, for example such as deletion of content, the plug-in can retrieve information (tag) from registry/central repository and restore the deleted information onto the device to the same location as it was prior to deletion thereby resorting the device to same state and making it easier for the user to identify the content on the device.

Figure 2:
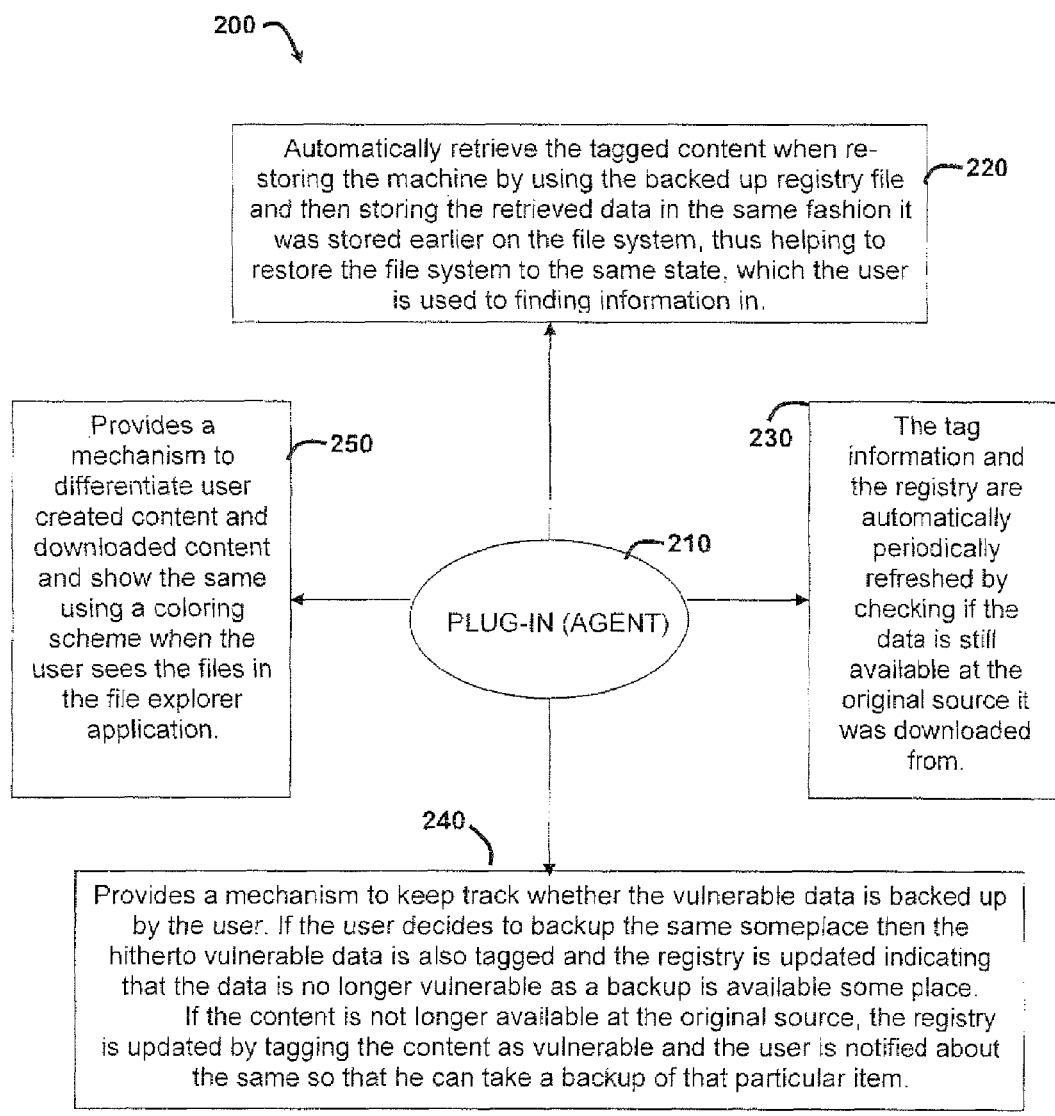
FIG. 2 illustrates an exemplary embodiment of the plug-in (agent) which performs the method for managing content of FIG. 1.

FIG. 2 illustrates an exemplary embodiment of the plug-in (agent) which performs the method for managing content of FIG. 1. The plug-in 210 (also referred to as the agent), can be implemented by means of software or hardware. A software agent is a piece of autonomous, or semi-autonomous proactive and reactive, computer software which can be configured to interact with and work in conjunction with the operating system. The agent is also defined as a software routine that waits in the background, preferably in an active state, and performs an action when a specified event occurs. The agent typically monitors the system and performs the necessary actions that are associated with it. Similarly, in one embodiment, the agent may be implemented in terms of hardware, embedded with device and in Conjunction with the operating system arranged for performing the relevant tasks, as have been previously described.

In one embodiment as described in 220, the agent is configured to automatically retrieve the content that has been tagged, typically in situations while re-storing the device. This is done by using the backed up registry file on the central server or on the device, as applicable, and then storing the retrieved data in the same fashion it was stored earlier on the file system. This helps to restore the file system on the device to the same state, which the user is used to finding information in prior to being deleted or removed from the device.

In a further embodiment as illustrated in 230, the agent is configured to automatically and periodically refresh the information (tag) and the registry by continuously pinging and checking if the content is still available at the original source it was downloaded from. If any risk is perceived at this stage during checking by the agent, the agent automatically creates a back-up of that data and updates the registry and the registry file stored on the central repository.

For example, consider that an Internet page has been downloaded from a particular site. The agent detects that the following page has been downloaded from the Internet and associated a unique identifier to classify this page. This unique identifier may be stored in the registry of the system and updated on the central repository. The agent is also configured to determine a risk associated with this page. In case the contents of the page is changed every week, the agent can back-up the previously downloaded page and fetch the new page, associate it with the previous identifier and create a set of links to identify the content that have been downloaded at different times of updates.

In a further embodiment, as illustrated in 240, the agent is configured to provide a mechanism to keep track whether the vulnerable data is backed up by the user. If the user decides to backup the same some place then the hitherto vulnerable data is also tagged and the registry is updated indicating that the data is no longer vulnerable as a backup is available some place. If the content is no longer available at the original source, the registry is updated by tagging the content as vulnerable and the user is notified about the same so that he can take a backup of that particular item.

In yet a further embodiment, as in 250, the agent is configured to provide a mechanism to differentiate user created content and downloaded content and show the same using a visual indicator such as a coloring scheme when the user can view the contents for example viewing files in the file explorer application.

Figure 3:
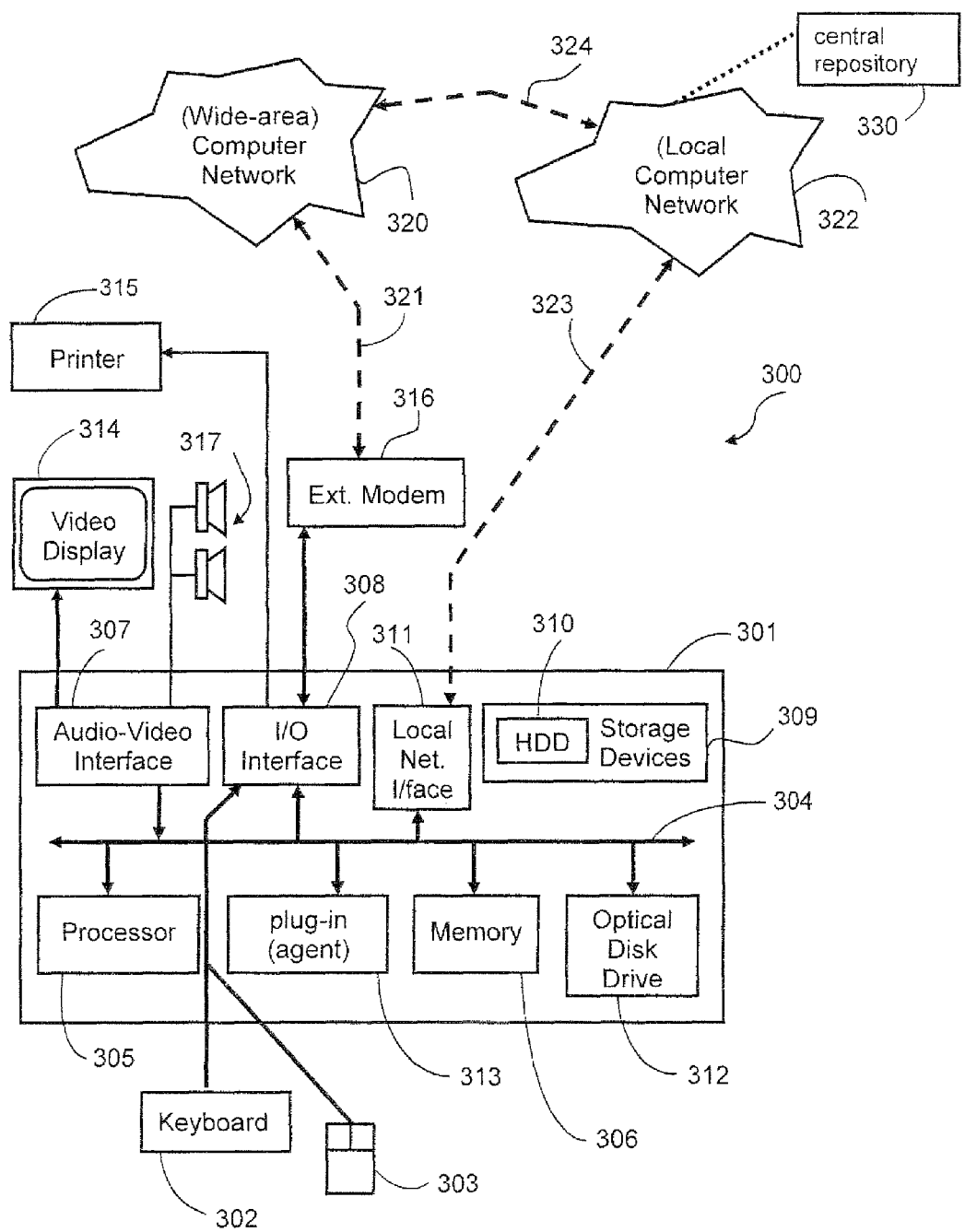
FIG. 3 illustrates an exemplary embodiment of an information handling device that is configured to execute the method of managing content of FIGS. 1-2.

The above embodiments may be implemented using a information handling device 300, for example a computer system, such as that shown in FIG. 3. It should be apparent to one skilled in that art that other information handling devices, such as mobile phones, laptop computers, PDAs etc., containing at least a processor and a memory and capable of processing data fall within the scope of this invention. The method described previously may be implemented as software, such as, as one or more application programs executable within the device 300 or an additional hardware element 313, wherein the software is embedded in the hardware element 313 and is configured to work in conjunction with the operating system of the device. In particular, the steps of the method may be realized by instructions in the software that are carried out within the device 300. The instructions may be formed as one or more program code modules, each for performing one or more particular tasks. The software may be stored in a readable medium, including the storage devices. In one embodiment, the software is loaded into the device 300 from the readable medium, and then executed by the device 300. A readable medium having such software or program recorded on it is defined as a computer program product.

As seen in FIG. 3, the device 300 is formed by a module 301, input devices such as a keyboard 302 and a mouse pointer device 303, and output devices including a printer 315, a display device 314 and loudspeakers 317. An external Modulator-Demodulator (Modem) transceiver device 316 may be used by the module 301 for communicating to and from a communications network 320 via a connection 321. The network 320 may be a wide-area network (WAN) such as the Internet or a private WAN. Where the connection 321 is a telephone line, the modem 316 may be a traditional "dial-up" modem. Alternatively, where the connection 321 is a high capacity (e.g. cable) connection, the modem 316 may be a broadband modem. A wireless modem may also be used for wireless connection to the network 320.

The module 301 typically includes at least one processor unit 305, and a memory unit 306 for example formed from semiconductor random access memory (RAM) and read only memory (ROM). The module 301 also includes a number of input/output (I/O) interfaces including an audio-video interface 307 that couples to the video display 314 and loudspeakers 317, an I/O interface 308 for the keyboard 302 and mouse 303 and optionally a joystick (not illustrated), for the external modem 3116 and printer 315, and optionally the hardware element 311, which when activated performs the method described previously. In some implementations, the modem 316 may be incorporated within the module 301, for example within the interface 308. The module 301 also has a local network interface 311 which, via a connection 323, permits coupling of the device 300 to a local network 322, known as a Local Area Network (LAN). As also illustrated, the local network 322 may also couple to the wide area network 320 via a connection 324, which would typically include a so-called "firewall" device or similar functionality. The network interface 311 may be formed by an Ethernet™ circuit card, a wireless Bluetooth™ or an IEEE 802.11 wireless arrangement.

The interfaces 308 may afford both serial and parallel connectivity, the former typically being implemented according to the Universal Serial Bus (USB) standards and having corresponding USB connectors (not illustrated). Storage devices 309 are provided and typically include a hard disk drive (HDD) 310. Other devices such as a floppy disk drive and a magnetic tape drive (not illustrated) may also be used. An optical disk drive 312 is typically provided to act as a non-volatile source of data. Portable memory devices, such optical disks (eg: CD-ROM, DVD), USB-RAM, and floppy disks for example may then be used as appropriate sources of data to the device 300. A central repository 330 is coupled to the system over the network, where the device is configured to store the registry and also used as a back-up means for the device to store critical information.

The components 305 to 313 of the module 301 typically communicate via an interconnected bus 304 and in a manner which results in a conventional mode of operation of the device 300 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 310 and read and controlled in execution by the processor 305. Intermediate storage of such programs and any data fetched from the networks 320 and 322 may be accomplished using the semiconductor memory 306, possibly in concert with the hard disk drive 310. In some instances, the application programs may be supplied to the user encoded on one or more CD-ROM and read via the corresponding drive 312, or alternatively may be read by the user from the networks 320 or 322. Still further, the software can also be loaded into the device 300 from other readable media, for example computer readable media.

Computer readable media refers to any storage medium that participates in providing instructions and/or data to the device 300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the module 301. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The operations disclosed may alternatively be implemented in dedicated hardware such as one or more integrated circuits performing the functions or sub functions of the described processes. Such dedicated hardware may include graphic processors, digital signal processors, or one or more microprocessors and associated memories.

It should be apparent to a person skilled in the art that the device 300 preferably include a variety of device comprising at least a processor and a memory capable of processing content and are not limited a variety of electronic devices such as desktop computers, application servers, web servers, database servers and the like and portable electronic devices such as mobile phones, personal digital assistants (PDAs), pocket personal computers, laptop computers, electronic devices, portable electronic devices, handheld electronic devices etc falls within the scope of the present invention.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware comprising several distinct elements.

What is claimed is:

1. A method for managing content on an information handling device, the method comprising:
    identifying creation of new content on the information handling device, wherein the new content is downloaded from a first source to create the new content, the information handling device having an operating system;
    tagging the new content created on the information handling device with a unique identifier including an IP address of the first source from which the new content was downloaded, the tagging including creating a tag, storing in the tag details from the operating system as to the new content, and, wherein the tag includes at least the unique identifier;
    storing the unique identifier in a file of a registry associated with the operating system of the information handling device, the storing of the unique identifier including storing the tag in the registry and being in a manner enabling repeat creation of the new content based on the details stored in the tag;
    backing up the registry file in a central repository instead of directly backing up the content in the central repository;
    determining whether the new content is unavailable at the IP address of the first source from which the new content was downloaded; and
    when the new content is unavailable at the IP address of the first source from which the new content was downloaded, updating the registry by tagging the new content as vulnerable, wherein vulnerability indicates that the new content is not available at the IP address of the first source from which the new content was downloaded, wherein the new content includes new content of a web page.

2. The method of claim 1, wherein the new content is created on the information handling device.

3. The method of claim 1, wherein the new content is downloaded from another device or location.

4. The method of claim 1, further comprising:
    providing a visual indicator to the user to differentiate between content created on the information handling device and content fetched from a different location or device, wherein the visual indicator is a coloring scheme.

5. The method of claim 1, further comprising:
    retrieving, when available, the tagged content by using the details stored in the tag when restoring the information handling device using the tag as stored in the registry; and
    storing the retrieved content on the information handling device in the same format as was present before the restore was needed.

6. The method of claim 1, wherein the registry is periodically updated with content details and the identifier associated with the content.

7. The method of claim 1, further comprising:
    determining whether the new content, that is tagged as vulnerable, is available at a new location.

8. The method of claim 7, further comprising:
    when the new content, that is tagged as vulnerable, is available at the new location, updating the registry by tagging the new content as no longer vulnerable.

9. The method of claim 1, further comprising:
    generating a notification for a user to back up the new content that is tagged as vulnerable.

10. An information handling device having at least a processor, a memory and a storage medium configured to create new content on the device further comprising:
    an agent executable by the processor and configured to:
    identify creation of new content on the device, wherein the new content is downloaded from a first source to create the new content, wherein the information handling device having an operating system;
    tag the new content by associating a respective unique identifier for each of the content created on the device including an IP address of the first source from which the new content was downloaded, wherein the tag stores details from the operating system as to the new content;

store the unique identifier in a file of a registry associated with the operating system of the device by storing the tag in the registry, the stored unique identifier enabling repeat creation of the new content based on the details stored in the tag, wherein the tag includes at least the unique identifier;

back up the registry file in a central repository instead of directly backing-up the content in the central repository;

determine whether the new content is unavailable at the IP address of the first source from which the new content was downloaded; and when the new content is unavailable at the IP address of the first source from which the new content was downloaded, update the registry by tagging the new content as vulnerable, wherein vulnerability indicates that the new content is not available at the IP address of the first source from which the new content was downloaded, wherein the new content includes new content of a web page.

11. The information handling device of claim 10, wherein new content is created on the device.

12. The information handling device of claim 10, wherein new content is downloaded from another device or location onto the device.

13. The information handling device of claim 10, wherein the agent is further configured to provide a visual indicator in terms of a coloring scheme to differentiate between content created on the device and content fetched from another device or locations.

14. The information handling device of claim 10, wherein the agent is further configured to retrieve, when available, the tagged content by using the details stored in the tag when restoring the device using the tag as stored in the registry and store the retrieved content in the same format as was present on the device prior to the restore being needed.

15. The information handling device of claim 10 wherein the agent is further configured to determine whether the new content, that is tagged as vulnerable, is available at a new location.

16. The information handling device of claim 15, wherein the agent is further configured to, when the new content, that is tagged as vulnerable, is available at the new location, update the registry by tagging the new content as no longer vulnerable.

17. A computer program product comprising:

a non-transitory computer readable medium comprising a computer readable program, wherein the computer readable program when executed on an information handling device causes the device to perform operations comprising:

identifying creation of new content on the information handling device, wherein the new content is downloaded from a first source to create the new content, the information handling device having an operating system;

tagging the new content created on the information handling device with a unique identifier including an IP address of the first source from which the new content was downloaded, the tagging including creating a tag, storing in the tag details from the operating system as to the new content, and, wherein the tag includes at least the unique identifier;

storing the unique identifier in a file of a registry associated with the operating system of the information handling device, the storing of the unique identifier including storing the tag in the registry and being in a manner enabling repeat creation of the new content based on the details stored in the tag;

backing up the registry file in a central repository instead of directly backing up the content in the central repository;

determining whether the new content is unavailable at the IP address of the first source from which the new content was downloaded; and when the new content is unavailable at the IP address of the first source from which the new content was downloaded, updating the registry by tagging the new content as vulnerable, wherein vulnerability indicates that the new content is not available at the IP address of the first source from which the new content was downloaded, wherein the new content includes new content of a web page.

* * * * *